United States Patent

[11] 3,579,866

[72] Inventor John Everett Miller
 4568 E. 45th St., Tulsa, Okla. 74135
[21] Appl. No. 804,058
[22] Filed Mar. 3, 1969
[45] Patented May 25, 1971

[54] POLYBASE COUNTER
 4 Claims, 8 Drawing Figs.
[52] U.S. Cl. .................................................... 35/32
[51] Int. Cl. .............................................. G09b 19/02
[50] Field of Search ........................................ 35/31.1,
 31.2, 32, 33, 30, 31, 77, 31.8, 72; 235/117, 117.1;
 40/68, 77.4, 77.8

[56] References Cited
UNITED STATES PATENTS
853,756 5/1907 Betis ............................ 35/77X
3,226,848 1/1966 Peterson ....................... 35/32

FOREIGN PATENTS
19,261 1904 Great Britain ................ 35/31(.4)
997,441 7/1965 Great Britain ................ 35/31(.2)

Primary Examiner—Wm. H. Grieb

ABSTRACT: This invention relates to a simple mechanical counter to be used as an instructional aid in teaching number systems of various different bases. It consists of a plurality of prismatic-shaped or cylindrical-shaped blocks freely mounted on a shaft which extends from a handle. The lateral faces of these blocks are numbered according to the base of the number system being used—each block in a set of blocks for base two being numbered "0" and "1," each block in a set of blocks for base three being numbered "0," "1," and "2," each block in a set of blocks for base four being numbered "0," "1," "2," and "3," and so on in this manner. A set of blocks is mounted on the shaft in such a way that by rotating the blocks in the proper manner consecutive numbering in a given base number system may be shown.

PATENTED MAY 25 1971
3,579,866
SHEET 1 OF 3
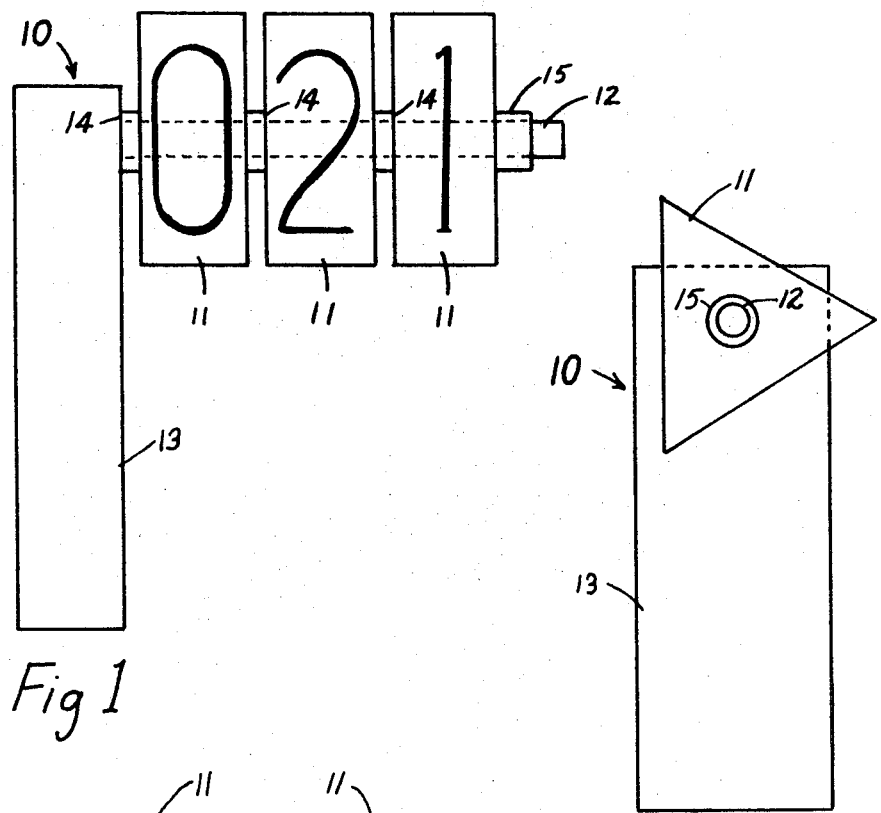
Fig 1
Fig. 2
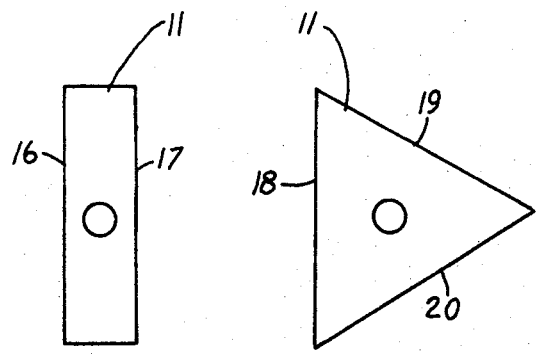
Fig. 3   Fig. 4
INVENTOR:
John Everett Miller INVENTOR:
John Everett Miller

POLYBASE COUNTER

The purpose of the polybase counter is to provide a tool with which students can learn to number consecutively in various base number systems by first learning to manipulate the counter—leading to an understanding of the structure of various base number systems and to an understanding of the relationship of the structure of the base 10 number system to the structure of other base number systems.

This polybase counter is a new invention in that it can be used with a plurality of number systems and in that the direct application of the counter as a teaching aid is different from that of other counters which mainly demonstrate or are of an entirely different nature. This polybase counter is also different in construction in that it is designed to be held by its handle with the left hand and manipulated with the right hand or can be used with a stand attachment as a table model.

FIG. 1 is the front elevation of the form of the invention which is preferred for use with the base three number system.

FIG. 2 is an end view of the same form.

FIG. 3 is an end view of a prismatic block for base two.

FIG. 4 is an end view of a prismatic block for base three.

Figure 5:
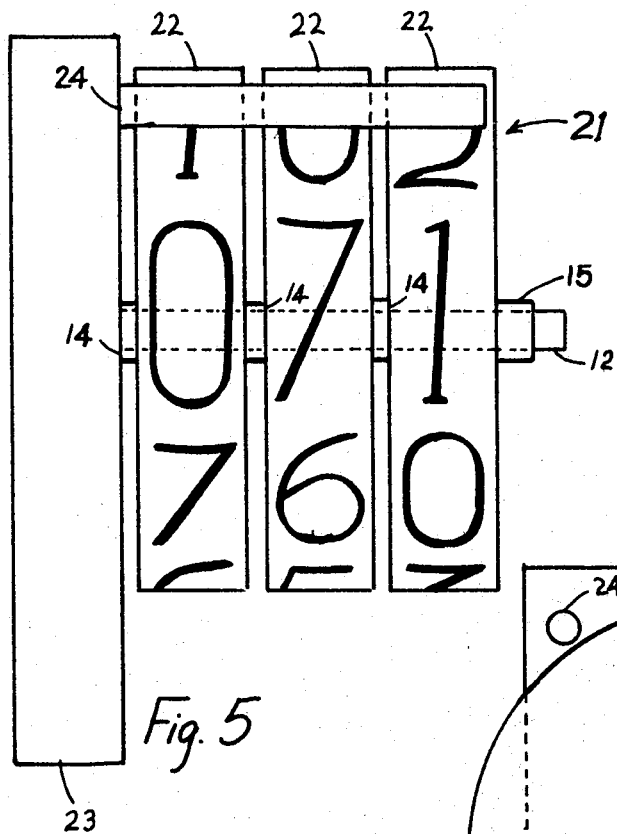
FIG. 5 is the front elevation of the form of the invention which is preferred for use with number systems whose bases are greater than six.

The device 10 of the invention, shown in FIG. 1 and 2, in the form illustrated, makes use of a plurality of prismatic blocks 11 which rotate freely on a shaft 12. The shaft 12 extends from a handle 13. Blocks 11 are separated by washers 14 and secured to the device 10 by the tightly fitting band 15. Blocks 11 have as many lateral faces as needed to show all of the symbols of a given number system, using one face per symbol.

FIG. 3 shows block 11 when used with the base two number system. Lateral face 16 is labeled with the numeral "0." Lateral face 17 is labeled with the numeral "1."

FIG. 4 shows block 11 as used with base three number system. Lateral face 18 is labeled with the numeral "0," lateral face 19 is labeled with the numeral "1," and lateral face 20 is labeled with the numeral "2."

The device 10, as shown in FIG. 1 and 2 is the preferred form for use with the base three number system. This same form but with the appropriate set of blocks 11 is also the preferred form for use with a base two, four, five, or six number system.

Figure 6:
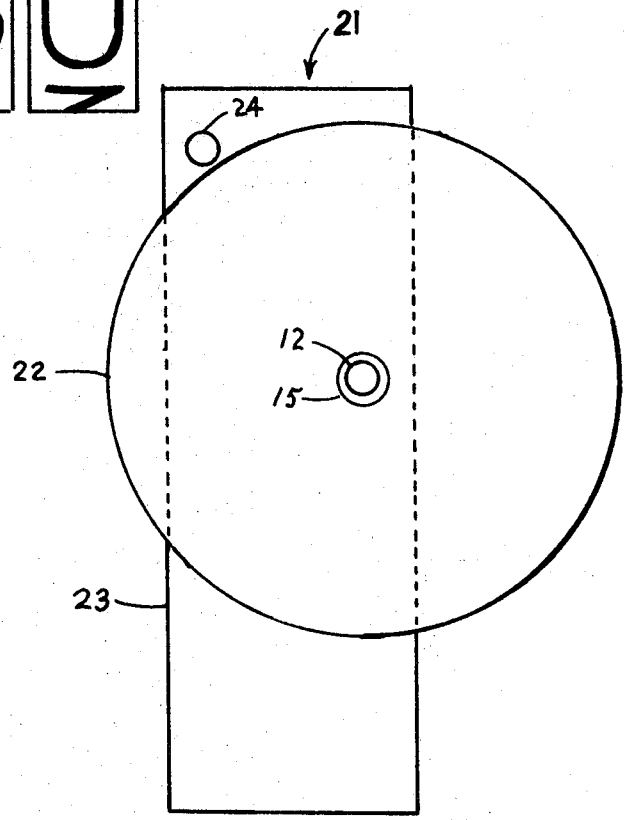
FIG. 6 is an end view of this form.

The device 21 as shown in FIGS. 5 and 6 is the preferred form for use with number systems whose bases are greater than six. Cylindrical blocks 22 rotate freely on shaft 12 which extends from handle 23. Each block 22 is numbered on its lateral face according to the symbols used in the number system being used. Blocks 22 are separated by washers 14 and secured to the device 21 by tightly fitting band 15. The dowell-like extension 24 is a marker above or below which a given number in the number system being used is read.

Figure 7:
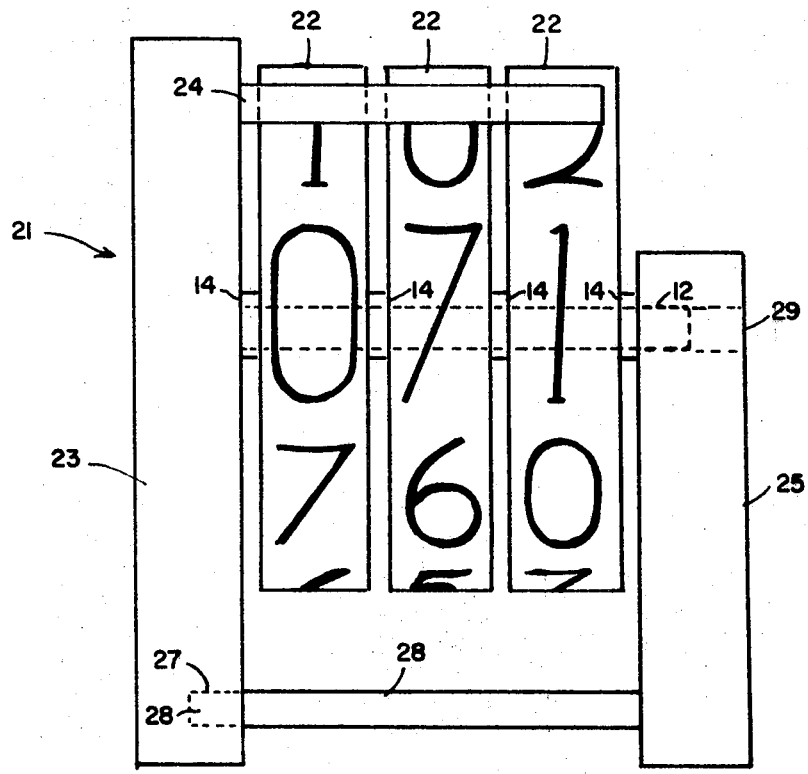
FIG. 7 is a front elevation of the invention showing a stand attachment which converts the polybase counter to a table model.
Figure 8:
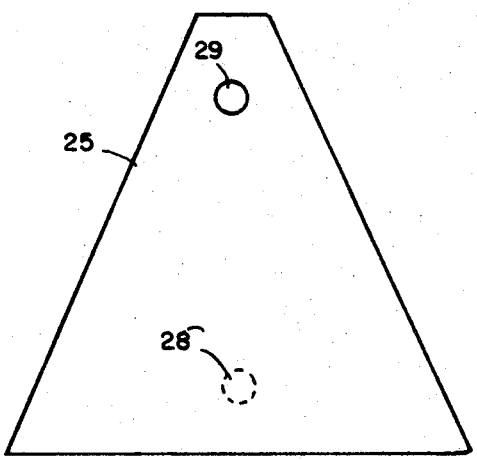
FIG. 8 is an end view of this attachment.

FIG. 7 shows attachment 25 as used with device 10 or 21. Attachment 25 allows the device to be used as a table model rather than one that is held in the hand as it is used. To use the attachment 25, band 15 in FIGS. 1, 2, 5, and 6 must be replaced with washer 14 and hole 27 must be made in handle 13 or 23. The end of dowell-like extension 28 of the attachment 25 fits snuggly into hole 28 in the handle 13 or 23. The end of shaft 12 fits into hole 29 in the attachment.

I claim:

1. A polybase counter device comprising of a plurality of prismatic blocks adapted to be interchangeably mounted to rotate freely on a shaft which extends from a handle, the blocks being made in sets of similar blocks with each set of blocks being made for a given number system, each block of each set having a plurality of numbered viewable faces equal to the given number systems.

2. A polybase counter device comprising of a plurality of cylindrical blocks adapted to be interchangeably mounted to rotate freely on a shaft which extends from a handle, the blocks being made in sets of similar blocks with each set of blocks being made for a given number system, each block of each set being divided into a plurality of numbered viewable arcs equal to a given number system.

3. A polybase counter device as described in claim 1 having a stand attachment which is joined to the device at the end of the shaft opposite the handle and to the lower end of the handle.

4. A polybase counter device as described in claim 2 having a stand attachment which is joined to the device at the end of the shaft opposite the handle and to the lower end of the handle.